United States Patent
Shibata et al.

(10) Patent No.: US 11,407,945 B2
(45) Date of Patent: Aug. 9, 2022

(54) HEAT TREATMENT APPARATUS

(71) Applicants: Katsumi Shibata, Fukuoka (JP); JRTEC CO., LTD., Tokyo (JP); BEST ALLIANCE CO., LTD., Tokyo (JP)

(72) Inventors: Katsumi Shibata, Fukuoka (JP); Hideki Namimatsu, Tokyo (JP); Masako Ikai, Tokyo (JP)

(73) Assignees: Katsumi Shibata, Fukuoka (JP); JRTEC CO., LTD., Tokyo (JP); BEST ALLIANCE CO., LTD., Tokyo (JP)

( * ) Notice: Subject to any disclaimer, the term of this patent is extended or adjusted under 35 U.S.C. 154(b) by 0 days.

(21) Appl. No.: 17/594,522

(22) PCT Filed: Aug. 31, 2020

(86) PCT No.: PCT/JP2020/032802
§ 371 (c)(1),
(2) Date: Oct. 20, 2021

(87) PCT Pub. No.: WO2021/079619
PCT Pub. Date: Apr. 29, 2021

(65) Prior Publication Data
US 2022/0089954 A1    Mar. 24, 2022

(30) Foreign Application Priority Data

Oct. 24, 2019    (JP) .............................. JP2019-193623

(51) Int. Cl.
*C10B 7/10*        (2006.01)
*F27B 9/24*        (2006.01)
(Continued)

(52) U.S. Cl.
CPC ................ *C10B 7/10* (2013.01); *C10B 21/00* (2013.01); *C10B 47/44* (2013.01); *C10B 57/02* (2013.01);
(Continued)

(58) Field of Classification Search
CPC ........... C10B 7/10; C10B 21/00; C10B 47/44; C10B 57/02; C10B 57/10; C10B 57/14;
(Continued)

(56) References Cited

U.S. PATENT DOCUMENTS 4,908,104 A  *  3/1990  Loomans ................ C10B 57/00
                                                    201/35
5,017,269 A  *  5/1991  Loomans .................. C10B 7/10
                                                    201/35
(Continued)

FOREIGN PATENT DOCUMENTS

EP        3546546 A1    10/2019
JP      2004263193 A     9/2004
(Continued)

OTHER PUBLICATIONS

International Search Report in PCT Application No. PCT/JP2020/032802, dated Oct. 20, 2020, 4pp.
(Continued)

*Primary Examiner* — Jonathan Miller
(74) *Attorney, Agent, or Firm* — Hauptman Ham, LLP (57) ABSTRACT

A heat treatment apparatus has a first screw conveyor, a second screw conveyor, a first nozzle pipe, and a second nozzle pipe. If the first screw conveyor rotates right, the first nozzle pipe is disposed on the left lateral side of the first screw conveyor. If the first screw conveyor rotates left, the first nozzle pipe is disposed on the right lateral side of the first screw conveyor. If the second screw conveyor rotates right, the second nozzle pipe is disposed on the left lateral side of the second screw conveyor. If the second screw conveyor rotates left, the second nozzle pipe is disposed on the right lateral side of the second screw conveyor.

4 Claims, 3 Drawing Sheets

(51) Int. Cl.
*F27D 7/02* (2006.01)
*F27B 9/04* (2006.01)
*C10B 47/44* (2006.01)
*C10B 57/02* (2006.01)
*C10B 57/14* (2006.01)
*C10B 21/00* (2006.01)
*C10B 57/10* (2006.01)

(52) U.S. Cl.
CPC ............... *C10B 57/10* (2013.01); *C10B 57/14* (2013.01); *F27B 9/045* (2013.01); *F27B 9/24* (2013.01); *F27D 7/02* (2013.01); *F27B 2009/2484* (2013.01); *F27D 2007/023* (2013.01)

(58) Field of Classification Search
CPC .... F27B 9/048; F27B 9/24; F27B 2009/2484; F27D 7/02; F27D 2007/023
See application file for complete search history.

(56) References Cited

U.S. PATENT DOCUMENTS

| | | | | |
|---|---|---|---|---|
| 6,619,214 B2* | 9/2003 | Walker | ............... | F23G 5/444 110/255 |
| 7,832,343 B2* | 11/2010 | Walker | ............... | F23G 5/46 110/229 |
| 8,282,787 B2* | 10/2012 | Tucker | ............... | C10B 53/00 95/114 |
| 8,328,993 B2* | 12/2012 | Feerer | ............... | F23G 5/0273 202/229 |
| 8,419,902 B2* | 4/2013 | Feerer | ............... | F23G 5/02 48/119 |
| 9,045,693 B2* | 6/2015 | Wolfe | ............... | C10B 49/10 |
| 9,605,210 B2* | 3/2017 | Tucker | ............... | C10B 53/00 |
| 2007/0186829 A1* | 8/2007 | Cole | ............... | C10B 53/00 110/229 |
| 2010/0288618 A1* | 11/2010 | Feerer | ............... | C10B 47/44 202/118 |
| 2011/0089015 A1* | 4/2011 | Kelley | ............... | C10B 7/00 202/117 |
| 2012/0266529 A1* | 10/2012 | Scahill | ............... | C10C 5/00 202/84 |
| 2018/0187085 A1* | 7/2018 | Ladygin | ............... | C10B 53/02 |
| 2019/0264109 A1* | 8/2019 | Gradov | ............... | C10B 53/07 |

FOREIGN PATENT DOCUMENTS

| | | |
|---|---|---|
| JP | 200886982 A | 4/2008 |
| JP | 2009138088 A | 6/2009 |
| RU | 2632293 C1 | 10/2017 |
| WO | 2017158649 A1 | 9/2017 |
| WO | 2018097757 A1 | 5/2018 |

OTHER PUBLICATIONS

Written Opinion in PCT Application No. PCT/JP2020/032802, dated Oct. 20, 2020, 6pp.

* cited by examiner

HEAT TREATMENT APPARATUS

RELATED APPLICATIONS

The present application is a National Phase of International Application No. PCT/JP2020/032802, filed Aug. 31, 2020, and claims priority based on Japanese Patent Application No. 2019-193623, filed Oct. 24, 2019.

TECHNICAL FIELD

The present invention relates to a heat treatment apparatus that performs, using superheated steam or a high-temperature combustion gas, heat treatment of raw materials to be treated, the heat treatment including drying, torrefaction, or carbonization.

BACKGROUND ART

Hitherto, there has been known a heat treatment apparatus that performs heat treatment of raw materials to be treated by using a first rotary kiln provided with a first nozzle pipe on the axial center thereof which ejects a high-temperature gas composed of high-temperature superheated steam or a high-temperature combustion gas, and a second rotary kiln provided with a second nozzle pipe on the axial center thereof which ejects ultra-high temperature superheated steam (e.g., Patent Document 1).

Patent Document 1: Japanese Patent Application Laid-Open No. 2004-263193

SUMMARY

Technical Problem

However, according to Patent Document 1, two rotary kilns are connected in series, and the rotary kilns are rotated to perform heat treatment of raw materials to be treated, thus taking time for the raw materials to be discharged. This has been making it impossible to increase amount of raw materials to be treated. In order to increase amount of raw materials to be treated, it is conceivable to increase the conveyance speed of the raw materials to be treated in the rotary kilns. In this case, however, the heat treatment time is reduced accordingly, and therefore, it has been necessary to increase heat treatment efficiency.

An object of the present invention is to provide a heat treatment apparatus capable of improving the efficiency of heat treatment of raw materials to be treated, thereby making it possible to increase the heat treatment amount of raw materials to be treated.

Solution to Problem

A heat treatment apparatus according to the present invention has: a first screw conveyor; a second screw conveyor in parallel with the first screw conveyor; a first nozzle pipe which is disposed on a lateral side of the first screw conveyor and which ejects a high-temperature gas composed of high-temperature superheated steam or a high-temperature combustion gas; and a second nozzle pipe which is disposed on a lateral side of the second screw conveyor and which ejects a high-temperature gas composed of high-temperature superheated steam or a high-temperature combustion gas, wherein, in the case where a discharge side is viewed from an input side for a raw material to be treated, the first nozzle pipe is disposed on a left lateral side of the first screw conveyor in the case where the first screw conveyor rotates right, and the first nozzle pipe is disposed on a right lateral side of the first screw conveyor in the case where the first screw conveyor rotates left, and in the case where a discharge side is viewed from an input side for a raw material to be treated, the second nozzle pipe is disposed on the left lateral side of the second screw conveyor in the case where the second screw conveyor rotates right, and the second nozzle pipe is disposed on the right lateral side of the second screw conveyor in the case where the second screw conveyor rotates left.

The above-described heat treatment apparatus may be configured such that, in the case where the discharge side is viewed from the input side for a raw material to be treated, the first screw conveyor rotates right and the second screw conveyor rotates left, and in a plan view from the input side to the discharge side for a material to be treated, the second screw conveyor is disposed on the right side of the first screw conveyor, the first nozzle pipe is disposed on the left lateral side of the first screw conveyor, and the second nozzle pipe is disposed on the right lateral side of the second screw conveyor.

The above-described heat treatment apparatus may be configured such that, in the case where the discharge side is viewed from the input side for a raw material to be treated, the first nozzle pipe is disposed on an upper left side of the first screw conveyor, the second nozzle pipe is disposed on an upper right side of the second screw conveyor, the first nozzle pipe and the second nozzle pipe have a plurality of ejection sections, which are nozzles or holes for ejecting the high-temperature gas, and the plurality of ejection sections eject a high-temperature gas downward or laterally downward.

The above-described heat treatment apparatus may be configured such that the high-temperature gas is superheated steam.

The above-described heat treatment apparatus may be configured such that the inside of a heat treatment furnace is filled with superheated steam to make the inside of the heat treatment furnace oxygen-free.

The above-described heat treatment apparatus may be configured to have: a first heat treatment furnace that performs drying treatment, or drying treatment and torrefaction; and a second heat treatment furnace that performs torrefaction or carbonization treatment, wherein the first screw conveyor, the second screw conveyor, the first nozzle pipe, and the second nozzle pipe are disposed in each of the first heat treatment furnace and the second heat treatment furnace.

Advantageous Effects of Invention

The present invention can provide a heat treatment apparatus that makes it possible to improve the efficiency of heat treatment of raw materials to be treated, thereby enabling an increase in the heat treatment amount of raw materials to be treated.

DESCRIPTION OF EMBODIMENTS

The following will describe a heat treatment apparatus according to the present invention with reference to the accompanying drawings. Materials to be subjected to heat treatment (hereinafter referred to as "raw materials to be treated") that are applicable to the heat treatment apparatus according to the present invention are viscous substances and/or solid substances excluding liquids and gases, and are, for example, raw materials to be treated that are primarily composed of woody materials generated from wood processing plants, waste intermediate treatment plants, and the like, or organic resources of biological origin. Further, the heat treatment apparatus according to the present invention is also applicable to heat treatment including drying, torrefaction or carbonization of raw materials and products composed of various organic or inorganic materials used in production plants, and the like. In addition, the heat treatment apparatus according to the present invention may perform the heat treatment of raw materials to be treated continuously or by batch.

First Embodiment

Figure 1:
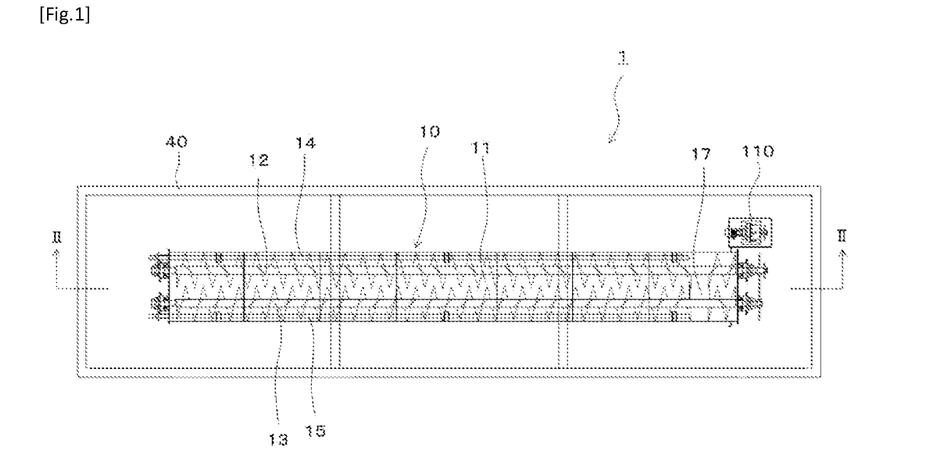
FIG. 1 is a plan sectional view of a heat treatment apparatus according to a first embodiment.
Figure 2:
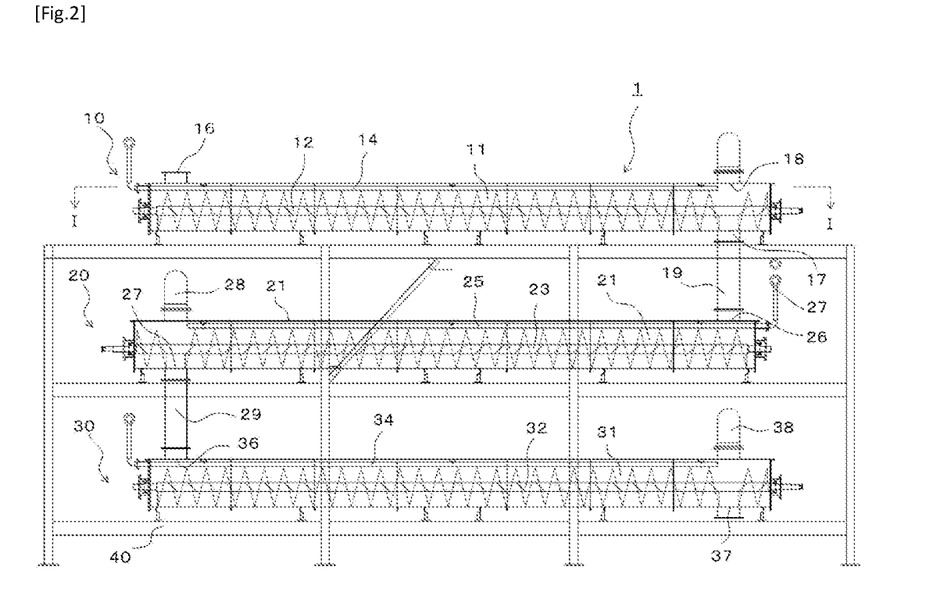
FIG. 2 is a side sectional view of the heat treatment apparatus according to the first embodiment.

FIG. 1 is a plan sectional view of a heat treatment apparatus 1 according to a first embodiment, and is a sectional view along I-I of FIG. 2. Further, FIG. 2 is a side sectional view of the heat treatment apparatus 1 according to the first embodiment, and is a sectional view along line II-II of FIG. 1. Further, FIG. 3 is a front view of the heat treatment apparatus 1 according to the first embodiment.

Figure 3:
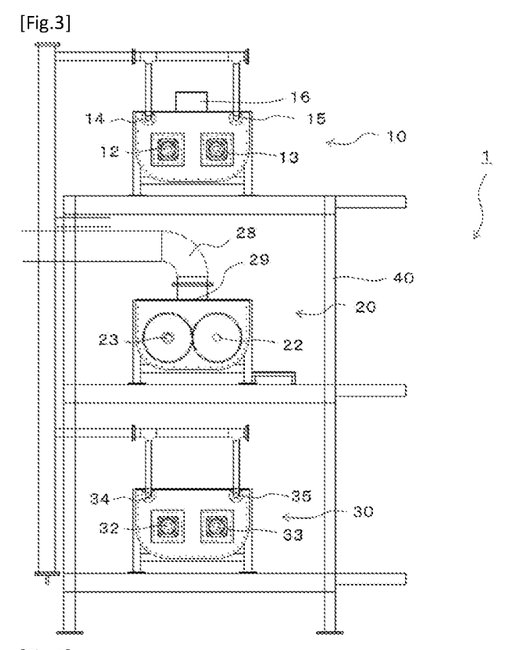
FIG. 3 is a front view of the heat treatment apparatus according to the first embodiment.

As illustrated in FIG. 2 and FIG. 3, the heat treatment apparatus 1 has a first kiln 10, a second kiln 20, a third kiln 30, and a stand 40. The stand 40 is a platform for placing thereon the first kiln 10, the second kiln 20, and the third kiln 30, and has a three-stage structure. In the present embodiment, as illustrated in FIG. 2 and FIG. 3, the first kiln 10 is placed on the upper stage of the stand 40, the second kiln 20 is placed on the middle stage of the stand 40, and the third kiln 30 is placed on the lower stage of the stand 40. This creates a structure in which the first kiln 10, the second kiln 20, and the third kiln 30 are vertically disposed in the heat treatment apparatus 1. On the other hand, the first kiln 10, the second kiln 20, and the third kiln 30 are in communication in series through the intermediary of discharge chutes 19 and 29, and raw materials to be treated fed into the first kiln 10 are conveyed through the first kiln 10, the second kiln 20, and the third kiln 30 while undergoing heat treatment, and then discharged as carbonized or torrefied materials from the third kiln 30. The first kiln 10 mainly performs the drying treatment of raw materials to be treated, and the second kiln 20 and the third kiln 30 mainly perform carbonization or torrefaction treatment of raw materials to be treated. The following will describe the configurations of the first kiln 10, the second kiln 20, and the third kiln 30.

The first kiln 10 has a heat treatment furnace 11 that performs heat treatment of raw materials to be treated. The length of the heat treatment furnace 11 is not particularly limited, but is 8 m to 12 m in the present embodiment. Further, the inner width of the heat treatment furnace 11 is also not particularly limited, but is 0.5 m to 2.0 m in the present embodiment. An input port (hopper) 16 for feeding raw materials to be treated is provided at one end of the heat treatment furnace 11, and a discharge port 17 for discharging the raw materials to be treated to the second kiln 20 is provided at the other end. Further, in the heat treatment furnace 11, a pair of screw conveyors 12, 13 and a pair of nozzle pipes 14, 15 are arranged in parallel, respectively, as illustrated in FIG. 1.

Of the pair of screw conveyors 12 and 13, the first screw conveyor 12 rotates right (rotates clockwise) to convey raw materials to be treated from the input port 16 to the discharge port 17 of the heat treatment furnace 11. Further, the second screw conveyor 13 rotates left (rotates counterclockwise) to convey the raw materials to be treated from the input port 16 to the discharge port 17 of the heat treatment furnace 11. As illustrated in FIG. 1 to FIG. 3, the first screw conveyor 12 and the second screw conveyor 13 are disposed in parallel, and the second screw conveyor 13 is disposed on the right side of the first screw conveyor 12 when observed in a plan view from the input port 16 side to the discharge port 17 side. The pair of screw conveyors 12 and 13 are rotated in the rotation directions thereof by the drive of a motor 110.

The pair of nozzle pipes 14 and 15 are disposed in the heat treatment furnace 11. As illustrated in FIG. 1 and FIG. 2, the first nozzle pipe 14 and the second nozzle pipe 15 extend in the heat treatment furnace 11, one ends thereof being connected with a superheated steam generator 50. Further, the first nozzle pipe 14 and the second nozzle pipe 15 are provided with ejection holes at predetermined intervals in an extending direction, and high-temperature superheated steam (200 to 700° C.) generated by the superheated steam generator 50 is ejected through the ejection holes thereby to perform the heat treatment of the raw materials to be treated inside the heat treatment furnace 11. The superheated steam generator 50 may also generate steam in place of superheated steam or in addition to superheated steam, and supply the generated steam to the heat treatment furnace 11.

Further, the first nozzle pipe 14 and the second nozzle pipe 15 are disposed in parallel to the first screw conveyor 12 and the second screw conveyor 13. More specifically, the first nozzle pipe 14 is disposed on the outer side with respect to the first screw conveyor 12, i.e., on the left side of the first screw conveyor 12 when observed from the input port 16 side to the discharge port 17 in a plan view. Similarly, the second nozzle pipe 15 is disposed on the outer side with respect to the second screw conveyor 13, i.e., on the right side of the second screw conveyor 13 when observed from the input port 16 side to the discharge port 17 side in a plan view.

In other words, according to the present embodiment, the pair of nozzle pipes 14 and 15 are disposed on the left side of the first screw conveyor 12, which rotates right (rotates clockwise), and on the right side of the second screw conveyor 13, which rotates left (rotates counterclockwise), respectively. This is because raw materials to be treated tend to be drawn to the side opposite from the rotation directions of the screw conveyors 12 and 13, so that the pair of nozzle pipes 14 and 15 are disposed on the opposite side from the rotation directions of the screw conveyors 12 and 13, thereby making it possible to efficiently perform the heat treatment of the raw materials to be treated, which have been drawn to the side opposite from the rotation directions of the screw conveyors 12 and 13.

Further, according to the present embodiment, as illustrated in FIG. 2, the first nozzle pipe 14 and the second nozzle pipe 15 are disposed upward of the first screw conveyor 12 and the second screw conveyor 13 and configured to eject superheated steam downward or laterally downward. This enables the pair of nozzle pipes 14 and 15 to eject the superheated steam toward the raw materials to be treated without interfering with the rotations of the screw conveyors 12 and 13.

Further, in the heat treatment apparatus 1 according to the present embodiment, the second kiln 20 and the third kiln 30 also have pairs of screw conveyors 22, 23 and 32, 33 and pairs of nozzle pipes 24, 25 and 34, 35 in heat treatment furnaces 21 and 31, respectively, as with the first kiln 10. In other words, also in the second kiln 20 and the third kiln 30, first screw conveyors 22 and 32, second screw conveyors 23 and 33, first nozzle pipes 24 and 34, and second nozzle pipes 25 and 35 are disposed in parallel, the first nozzle pipes 24 and 34 are disposed on the left side of the first screw conveyors 22 and 32, which rotate right (rotate clockwise) and the second nozzle pipes 25 and 35 are disposed on the right side of the second screw conveyors 23 and 33, which rotate left (rotate counterclockwise). In addition, the first nozzle pipes 24, 34 and the second nozzle pipes 25, 35 are disposed upward of the first screw conveyors 22, 32 and the second screw conveyors 23, 33. In the second kiln 20 and the third kiln 30 also, the nozzle pipes 24, 25 and 34, 35 are disposed on the opposite side from the rotation directions of the screw conveyors 22, 23 and 32, 33, thus making it possible to efficiently perform heat treatment of the raw materials to be treated that have been drawn to the side opposite from the rotation directions of the screw conveyors 22, 23 and 32, 33.

In the heat treatment apparatus 1, the heat treatment furnace 11 of the first kiln 10 and the heat treatment furnace 21 of the second kiln 20 are in communication through the intermediary of the discharge chute 19. The raw materials to be treated that have been conveyed to the discharge port 17 of the heat treatment furnace 11 of the first kiln 10 pass through the discharge port 17, the discharge chute 19, and the input port 26 of the second kiln 20 in this order, and then conveyed into the heat treatment furnace 21 of the second kiln 20. Further, in the heat treatment furnace 21 of the second kiln 20, the raw materials to be treated are conveyed to a discharge port 27 of the heat treatment furnace 21 by the pair of screw conveyors 22 and 23 from the input port 26 side to the discharge port 27 side. Further, in the heat treatment apparatus 1 according to the present embodiment, the heat treatment furnace 21 of the second kiln 20 and the heat treatment furnace 31 of the third kiln 30 are in communication through the intermediary of the discharge chute 29, and the raw materials to be treated pass through the discharge port 27 of the heat treatment furnace 21 of the second kiln 20, the discharge chute 29, and the input port 36 of the third kiln 30 in this order, and are conveyed into the heat treatment furnace 31 of the third kiln 30. Then, the raw materials to be treated are conveyed in the heat treatment furnace 31 of the third kiln 30 by the pair of screw conveyors 32 and 33 from the input port 36 side to the discharge port 37 side, and discharged to the outside through the discharge port 37 of the heat treatment furnace 31. The discharge chutes 19, 29 and the discharge ports 17, 27, 37 may be provided with on-off valves for opening and closing the discharge chutes and the discharge ports.

In the first kiln 10, the second kiln 20, and the third kiln 30, the superheated steam ejected from the first nozzle pipes 14, 24, 34 and the second nozzle pipes 15, 25, 35 may be high-temperature superheated steam (200 to 700° C.) generated by the superheated steam generator 50 or ultra-high-temperature superheated steam (300 to 1200° C.) generated by further heating the high-temperature superheated steam (200 to 700° C.), which has been generated by the superheated steam generator 50, by a steam heater (super heater). Alternatively, a steam heater (not illustrated) may be used to generate ultra-high-temperature superheated steam (200 to 1200° C.) at one time from saturated steam generated by the superheated steam generator 50. Further, the temperature of the superheated steam may be changed as appropriate for each of the kilns 10, 20, and 30.

Under the discharge port 37 of the third kiln 30, a treated material discharge mechanism may be provided, which lowers the temperature of the treated raw materials discharged from the discharge port 37 under an oxygen-free condition to a temperature at which the treated raw materials do not burn in the atmosphere (i.e., non-self-burning temperature) and then discharges the treated raw materials to the outside. In this case, the treated material discharge mechanism includes a discharge conveyor with a total length of approximately 3 m (preferably approximately 2 to 5 m), and the treated raw materials that have been heat-treated and reduced in volume by the heat treatment apparatus 1 may be slowly conveyed under a condition in which oxygen has been driven out by superheated steam, thereby lowering the treated raw materials to a temperature of 100° C. or lower (an ignition point or lower).

Further, the components of the heat treatment apparatus 1 are used at high temperatures, so that the surroundings may be composed of heat-resistant materials (e.g., stainless steel or heat-resistant steel), or the like, and the interior may be constructed of bricks with strength or heat-resistant and wear-resistant ceramics or the like attached for ultra-high temperatures. Normally, the shell is made of stainless steel and the outside is thermally insulated with ceramic fiber for high-temperature applications, or the like.

Figure 4:
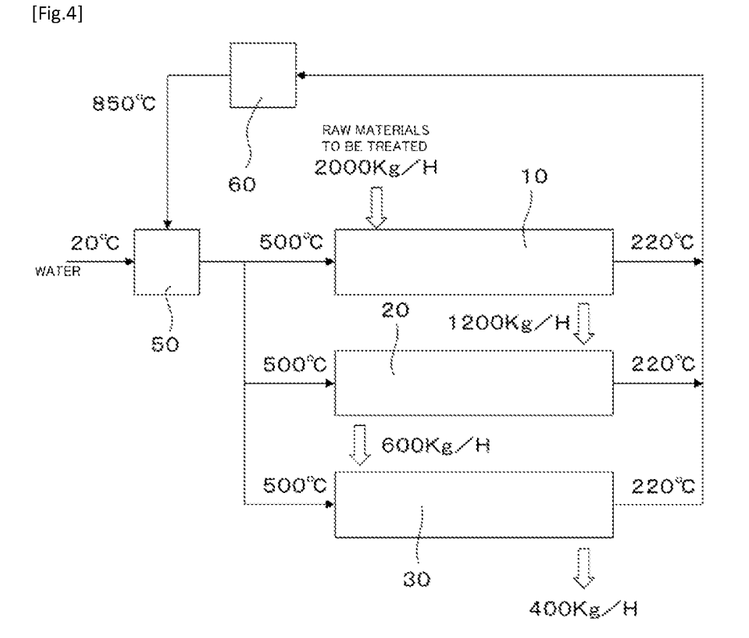
FIG. 4 is a diagram for explaining the heat treatment operation of the heat treatment apparatus according to the first embodiment.

A description will now be given of an operation example of the heat treatment apparatus 1 according to the present embodiment. In this operation example, as illustrated in FIG. 4, heavy oil, LPG, LNG, and the dry distillation gas in the exhaust gas generated in each of the kilns 10, 20, and 30 are used as fuels to generate a combustion gas in a combustion furnace 60, and the generated combustion gas is supplied to the superheated steam generator 50. In the superheated steam generator 50, supplied water of approximately 20° C. is turned into steam by the combustion gas and further heated to generate superheated steam of a high temperature of 100 to 800° C. (500° C. in this operation example). Then, the superheated steam of approximately 500° C. generated in the superheated steam generator 50 is supplied to each of the first nozzle pipes 14, 24, 34 and the second nozzle pipes 15, 25, 35, and ejected at the heat treatment furnace 11 of the first kiln 10, the heat treatment furnace 21 of the second kiln 20, and the heat treatment furnace 31 of the third kiln 30 from the first nozzle pipes 14, 24, 34 and the second nozzle pipes 15, 25, 35.

In this operation example, raw materials to be treated, which are carbon-containing compounds (e.g., wood chips (organic wastes) crushed into 0.5 to 2 cm pieces), are fed into the heat treatment furnace 11 of the first kiln 10 at a rate of, for example, 2000 kg/hour (H). Consequently, the raw materials to be treated are heated at a high temperature in the heat treatment furnace 11 of the first kiln 10, and dried even if the raw materials to be treated contain a large amount of moisture, and a part thereof is torrefied. In the present embodiment, the residence time in the first kiln 10 is adjusted such that the raw materials to be treated are sufficiently dried. The residence time of the raw materials to be treated in the heat treatment furnace 11 of the first kiln 10 changes according to the rotation speeds of the pair of screw conveyors 12 and 13, therefore the rotation speeds of the pair of screw conveyors 12 and 13 are adjusted such that the residence time is long enough to fully dry the raw materials to be treated. Then, the raw materials to be treated that have been subjected to the heat treatment (drying treatment) in the heat treatment furnace 11 of the first kiln 10 are fed into the heat treatment furnace 21 of the second kiln 20 through the discharge port 17. At this time, a certain amount of moisture has been removed from the raw materials to be treated, so that the amount of raw materials to be treated fed into the heat treatment furnace 21 of the second kiln 20 is approximately 1200 kg/hour in the present embodiment.

Also in the second kiln 20, high-temperature superheated steam heated to approximately 500° C. is ejected into the heat treatment furnace 21 through the pair of nozzle pipes 24 and 25 to perform heat treatment of the raw materials to be treated, as with the first kiln 10. In the heat treatment furnace 21 of the second kiln 20, mainly carbonization treatment or torrefaction treatment is performed, and drying treatment is performed on a part of raw materials to be treated. The carbonization treatment or torrefaction treatment is a process of carbonizing or torrefying organic raw materials to be treated by exposing the raw materials to high-temperature superheated steam under an oxygen-free condition. When the raw materials to be treated are carbonized or torrefied, elements other than carbon contained in the raw materials to be treated decompose, generating a combustible gas. The gas discharged from the heat treatment furnace 21 contains a combustible gas (dry distillation gas) and has a high temperature of approximately 220° C., so that the discharged gas may be suctioned and collected by a fan or the like through an intake pipe 28 and supplied to the combustion furnace 60 to increase the fuel efficiency of the heat treatment apparatus 1 (the same applies to the first kiln 10 and the third kiln).

After the heat treatment is performed in the second kiln 20, the raw materials to be treated are conveyed into the third kiln 30 through the discharge port 27, and are subjected to heat treatment in the same manner in the third kiln 30. In the first embodiment, the amount of the raw materials to be treated that are fed into the third kiln 30 is approximately 600 kg/hour, and eventually, approximately 400 kg/hour of carbonized or torrefied materials can be obtained.

The operation example described above is an example of the operation of the heat treatment apparatus 1 according to the present embodiment, and the temperature of superheated steam or the input amount of raw materials to be treated is not limited to those in the above-described operation example. Further, in the case where raw materials to be treated are carbonized, superheated steam heated to a higher temperature (e.g., approximately 680° C.) than the operation described above can be generated in the superheated steam generator 50 and supplied to the kilns 10, 20, and 30, thereby carbonizing the raw materials to be treated so as to obtain carbonized materials.

As described above, the heat treatment apparatus 1 according to the present embodiment has the pair of screw conveyors 12, 13 and the pair of nozzle pipes 14, 15. The first nozzle pipe 14 is disposed on the lateral left side of the first screw conveyor 12, which rotates right, and the second nozzle pipe 15 is disposed on the lateral right side of the second screw conveyor 13, which rotates left. As a result of intensive research to improve the efficiency of heat treatment of raw materials to be treated, the inventors found that raw materials to be treated tend to be drawn to the opposite side from the rotation directions of the screw conveyors 12 and 13 and that the heat treatment of raw materials to be treated, which are drawn to the opposite side from the rotation directions of the screw conveyors 12 and 13, can be efficiently performed by disposing the first nozzle pipe 14 on the lateral left side of the first screw conveyor 12, which rotates right, and disposing the second nozzle pipe 15 on the lateral right side of the second screw conveyor 13, which rotates left. As described above, the heat treatment apparatus 1 according to the first embodiment can significantly improve the heat treatment efficiency as compared with conventional heat treatment apparatuses by disposing the first nozzle pipe 14 on the lateral left side of the first screw conveyor 12, which rotates right, and disposing the second nozzle pipe 15 on the lateral right side of the second screw conveyor 13, which rotates left, thus making it possible to significantly increase the amount of the heat treatment of raw materials to be treated. In addition, superheated steam has a larger thermal capacity per unit volume than heated air and has extremely higher thermal conductivity, so that raw materials to be treated can be efficiently dried, torrefied, and carbonized by performing heat treatment using superheated steam. Further, the interiors of the heat treatment furnaces 11, 21 and 31 can be made oxygen-free by filling the heat treatment furnaces 11, 21 and 31 with superheated steam, making it possible to torrefy or carbonize raw materials to be treated. Thus, as compared with conventional heat treatment apparatuses, the heat treatment apparatus 1 according to the present embodiment can significantly improve the heat treatment efficiency with a resultant increase in the amount of raw materials to be treated, enabling the heat treatment of raw materials to be treated at a level of capacity that is practical for recycling projects of raw materials to be treated, and the like.

Further, in the heat treatment apparatus 1 according to the first embodiment, the first nozzle pipe 14 is disposed on the upper left side of the first screw conveyor 12, and the second nozzle pipe 15 is disposed on the upper right side of the second screw conveyor 13. The first nozzle pipe 14 and the second nozzle pipe 15 have nozzles or holes for ejecting a high-temperature gas and eject superheated steam downward or laterally downward. This enables the heat treatment apparatus 1 according to the present embodiment to efficiently perform heat treatment of raw materials to be treated that are drawn to the side opposite from the rotation directions of the screw conveyors 12 and 13 without causing the nozzle pipes 14 and 15 to come in contact with the screw conveyors 12 and 13.

In addition, conventionally (e.g., Patent Document 1), rotary kilns rather than screw conveyors have been used, and raw materials to be treated have been conveyed inside the rotary kilns (in furnaces) while rotating the rotary kilns to heat the raw materials to be treated. However, in such a configuration, the conveyance speed of the raw materials to be treated in the furnaces varies depending on the shapes or orientations of the raw materials to be treated, so that the conveyance speed of the raw materials to be treated in the furnaces varies even if the raw materials to be treated are fed in a predetermined amount and at a predetermined speed. As a result, there have been cases where the heating time of the raw materials to be treated varies and a part of the raw materials to be treated is insufficiently heated or overheated. Especially when producing torrefied materials, there have been cases where the materials are undercarbonized or overcarbonized, resulting in a problem of quality deterioration. In contrast, the heat treatment apparatus 1 according to the present embodiment is provided with the screw conveyors 12 and 13, which allow the conveyance speed of the raw materials to be treated in the furnaces to be kept substantially constant and the heating time to be kept substantially constant, so that high-quality carbonized or torrefied materials due to a substantially uniform degree of heat treatment can be obtained.

Second Embodiment

Figure 5:
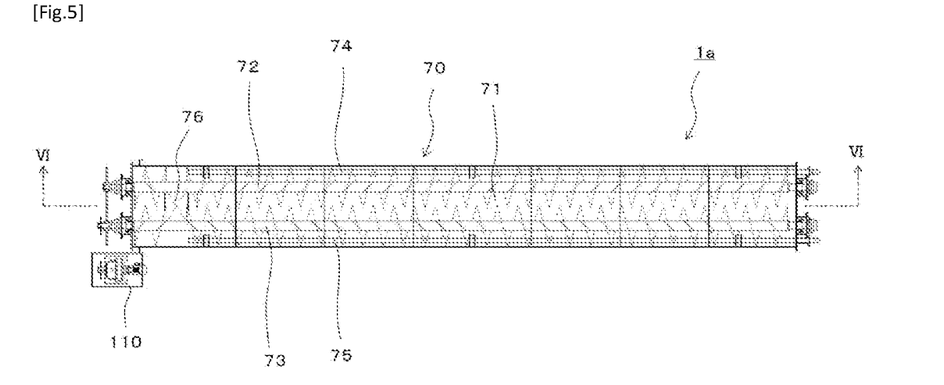
FIG. 5 is a plan sectional view of a heat treatment apparatus according to a second embodiment.
Figure 6:
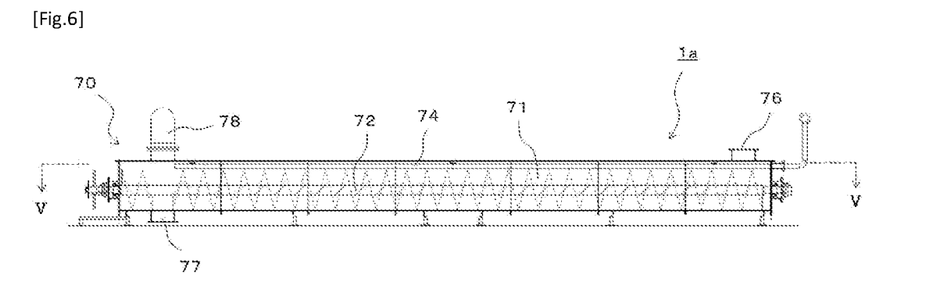
FIG. 6 is a side sectional view of the heat treatment apparatus according to the second embodiment.
Figure 7:
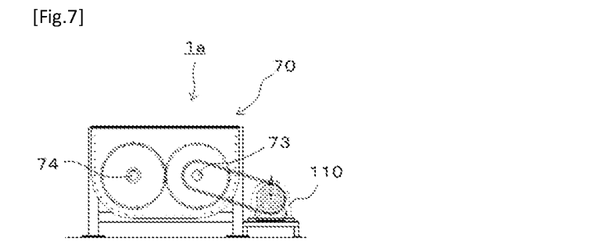
FIG. 7 is a front view of the heat treatment apparatus according to the second embodiment.

A second embodiment of the present invention will now be described. FIG. 5 is a plan sectional view of a heat treatment apparatus 1a according to a second embodiment, and is a sectional view taken along line V-V of FIG. 6. FIG. 6 is a side sectional view of the heat treatment apparatus 1a according to the second embodiment, and is a sectional view taken along line VI-VI of FIG. 5. Further, FIG. 7 is a front view of the heat treatment apparatus 1a according to the second embodiment.

In the second embodiment, the heat treatment apparatus 1a has a single kiln 70. The kiln 70 has a heat treatment furnace 71, and the heat treatment furnace 71 has a pair of screw conveyors 72, 73 and a pair of nozzle pipes 74, 75. In the second embodiment also, the first screw conveyor 72 and the second screw conveyor 73, and the first nozzle pipe 74 and the second nozzle pipe 75 are disposed in parallel, the first nozzle pipe 74 is disposed on the left side of the first screw conveyor 72, which rotates right (rotates clockwise), and the second nozzle pipe 75 is disposed on the right side of the second screw conveyor 73, which rotates left (rotates counterclockwise). Further, the first nozzle pipe 74 and the second nozzle pipe 75 are disposed upward of the first screw conveyor 72 and the second screw conveyor 73. This enables the heat treatment apparatus 1a according to the second embodiment also to efficiently perform heat treatment of raw materials to be treated that are drawn to the side opposite from the rotation directions of the screw conveyors 72 and 73.

In addition, the heat treatment apparatus 1a according to the second embodiment is configured to have the only one kiln 70, making it possible to increase the length of the heat treatment furnace 71, as compared with the first kiln 10, the second kiln 20, and the third kiln 30 according to the first embodiment, so as to enable sufficient heat treatment of raw materials to be treated. In this case, the pair of screw conveyors 72, 73 and the pair of nozzle pipes 74, 75 are configured to be longer than those of the first embodiment. Thus, the heat treatment apparatus 1a according to the second embodiment is configured to permit longer heat treatment time in the heat treatment furnace 71 by making the heat treatment furnace 71 longer, as compared with the first embodiment, so that raw materials to be treated can be dried, carbonized, or torrefied with a simpler structure without using the three-stage kiln configuration as in the heat treatment apparatus 1 according to the first embodiment. In addition, the degree of drying, carbonization, or torrefaction of raw materials to be treated may be adjusted by adjusting the length of the heat treatment furnace 71.

Further, in order to perform sufficient heat treatment of raw materials to be treated, the heat treatment apparatus 1a according to the second embodiment may be configured to reduce the rotation speeds of the pair of screw conveyors 72 and 73 so as to reduce the conveyance speed of the raw materials to be treated, as compared with the heat treatment apparatus 1 of the first embodiment. Thus, as compared with the first embodiment, in the heat treatment apparatus 1a according to the second embodiment, the time for the heat treatment in the heat treatment furnace 71 may be made longer by reducing the conveyance speed of raw materials to be treated, and the raw materials to be treated can be dried, carbonized or torrefied with the simple structure without using the three-stage kiln configuration as in the heat treatment apparatus 1 according to the first embodiment. Further, the degree of drying, carbonization, or torrefaction of raw materials to be treated may be adjusted by adjusting the rotation speeds of the pair of screw conveyors 72 and 73.

Figure 8:
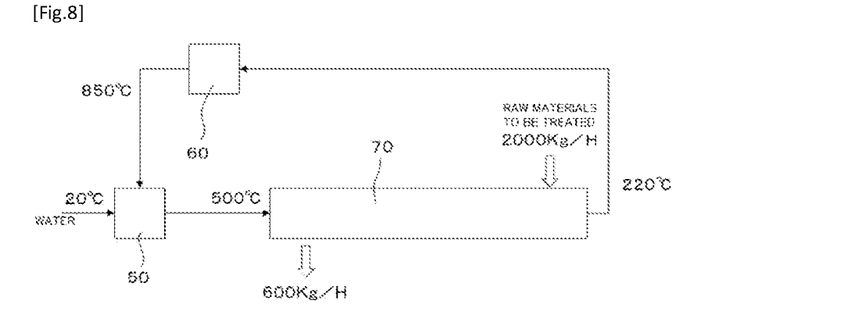
FIG. 8 is a diagram for explaining the heat treatment operation of the heat treatment apparatus according to the second embodiment.

FIG. 8 is a diagram illustrating an operation example of the heat treatment apparatus 1a according to the second embodiment. As with the operation example of FIG. 4, in the operation example illustrated in FIG. 8 also, a combustion gas is generated in the combustion furnace 60 and the generated combustion gas is supplied to a superheated steam generator 50 thereby to produce high-temperature superheated steam, which is supplied to the first nozzle pipe 74 and the second nozzle pipe 75. In this operation example, raw materials to be treated, which are carbon-containing compounds, are fed into the heat treatment furnace 71 of the kiln 70 at a rate of, for example, 2000 kg/hour (H). Consequently, the raw materials to be treated are heated at a high temperature in the heat treatment furnace 71 of the kiln 70, and even if the raw materials to be treated contain a large amount of moisture, the raw materials to be treated are dried and torrefied or carbonized while being conveyed in the heat treatment furnace 71. Further, in this operation example, carbonized or torrefied materials of approximately 600 kg/hour are obtained from a discharge port 77 of the heat treatment furnace 71.

As described above, as with the first embodiment, the heat treatment apparatus 1a according to the second embodiment has the pair of screw conveyors 72, 73 and the pair of nozzle pipes 74, 75, the first nozzle pipe 74 being disposed on the lateral left side of the first screw conveyor 72, which rotates right, and the second nozzle pipe 75 being disposed on the lateral right side of the second screw conveyor 73, which rotates left. This makes it possible to efficiently perform heat treatment of raw materials to be treated, which tend to be drawn to the side opposite from the rotation directions of the screw conveyors 72 and 73. In addition, the heat treatment apparatus 1a according to the second embodiment is configured to have the single kiln 70, so that the structure of the heat treatment apparatus 1a can be simplified and the manufacturing cost of the heat treatment apparatus 1a can be therefore reduced. Further, in the heat treatment apparatus 1a according to the second embodiment, by adjusting the length of the heat treatment furnace 71 and the rotation speeds of the pair of screw conveyors 72 and 73, the time for heat treatment of raw materials to be treated can be adjusted, and the degree of drying, carbonization, or torrefaction of the raw materials to be treated can be adjusted.

Although the preferred embodiments of the present invention have been described above, the technical scope of the present invention is not limited to the description of the above embodiments. Various changes and improvements can be added to the above embodiment examples, and those with such changes or improvements are also included in the technical scope of the present invention.

For example, the above-described embodiments have illustrated the configurations in which the first screw conveyor 12 is disposed on the left side and the second screw conveyor 13 is placed on the right side, and the first nozzle pipe 14 is disposed on the left side of the first screw conveyor 12 rotating right (rotating clockwise) and the second nozzle pipe 15 is disposed on the right side of the second screw conveyor 13 rotating left (rotating counterclockwise) when observed in a plan view from the input port 16 side to the discharge port 17 side; however, the present invention is not limited to the configurations. Alternatively, a configuration may be used, in which the first screw conveyor 12 is disposed on the right side and the second screw conveyor 13 is disposed on the left side, and the first nozzle pipe 14 is disposed on the left side (i.e., a center side) of the first screw conveyor 12 rotating right (rotating clockwise) and the second nozzle pipe 15 is disposed on the right side (i.e., the center side) of the second screw conveyor 13 rotating left (rotating counterclockwise). In this case also, the first nozzle pipe 14 is disposed on the side opposite from the rotation direction of the first screw conveyor 12, and the second nozzle pipe 15 is disposed on the side opposite from the rotation direction of the second screw conveyor 13, so that raw materials to be treated that have been drawn to the side opposite from the rotation directions of the screw conveyors can be efficiently subjected to heat treatment.

In addition, the above-described embodiments have illustrated the configurations in which superheated steam is ejected to perform the heat treatment of raw materials to be treated; however, the present invention is not limited to the configurations, and a configuration may be used, in which a high-temperature combustion gas in place of superheated steam is ejected to perform the heat treatment of raw materials to be treated. Further, the heat treatment apparatus 1 according to the first embodiment described above may be configured to use superheated steam to perform the heat treatment in the first kiln 10, and use a high-temperature combustion gas to perform the heat treatment in the second kiln 20 and the third kiln.

Further, the above-described embodiments have illustrated the configurations in which each of the kilns 10, 20, 30, and 70 is disposed substantially horizontally; however, the present invention is not limited to the configurations, and a configuration may be used, in which each of the kilns 10, 20, 30, and 70 is inclined downward in the range of, for example, 0.2 to 2 degrees, such that the sides thereof adjacent to the discharge ports 17, 27, 37, and 77 are lower.

In addition, the above-described embodiments have illustrated the configurations in which wood chips are applied as the raw materials to be treated; however, the present invention is not limited thereto. For example, plants, algae, garbage, chicken manure, livestock manure, urban sludge, sewage sludge, construction waste, food waste, and waste plastic containing carbon can be used as the raw materials to be treated.

Further, the above-described embodiments have illustrated the configurations in which the pairs of screw conveyors 12, 13, 22, 23, 32, 33, 72 and 73 are rotated by chains; however, the present invention is not limited to the configurations, and a configuration in which these pairs of screw conveyors are rotated by wheels may be used. In addition, although the pairs of nozzle pipes 14, 15, 24, 25, 34, 35, 74 and 75 are parallel to the axial centers of the kilns 10, 20, 30 and 70, the pairs of nozzle pipes do not necessarily have to be parallel or linear, and may be arranged in, for example, a zigzag pattern.

Further, the above-described embodiments have illustrated the configurations in which the first kiln 10 or the kiln 70 has the input port 16 or 76. In addition to the configurations, a configuration that further has a conveyor or the like for feeding raw materials to be treated into the input port 16 or 76 may be used.

Further, although the above-described first embodiment has illustrated the configuration that includes the three kilns, namely, the first kiln 10, the second kiln 20, and the third kiln 30, the present invention is not limited to the configuration, and a configuration that includes only the first kiln 10 and the second kiln 20, or four or more kilns may be used.

In addition, although the above-described embodiments have illustrated the configurations having the pairs of screw conveyors, a configuration having a single screw conveyor or three or more screw conveyors may be used. However, in this case also, the nozzle pipe is to be disposed on the lateral left side of the screw conveyor rotating right, and the nozzle pipe is to be disposed on the lateral right side of the screw conveyor rotating left. Similarly, although the above-described embodiments have illustrated the configurations having the pairs of nozzle pipes, a configuration that includes a single nozzle pipe, or three or more nozzle pipes may be used. In this case also, the nozzle pipe or pipes are disposed on the lateral left side of the screw conveyor rotating right, and the nozzle pipe or pipes are disposed on the lateral right side of the screw conveyor rotating left.

REFERENCE SIGNS LIST 1, 1a . . . heat treatment apparatus
10, 20, 30, 70 . . . kiln
11, 21, 31, 71 . . . heat treatment furnace
12, 22, 32, 72 . . . first screw conveyor
13, 23, 33, 73 . . . second screw conveyor
14, 24, 34, 74 . . . first nozzle pipe
15, 25, 35, 75 . . . second nozzle pipe
16, 26, 36, 76 . . . input port
17, 27, 37, 77 . . . discharge port
18, 28, 38, 78 . . . intake pipe
19, 29 . . . discharge chute
50 . . . superheated steam generator
60 . . . combustion furnace

The invention claimed is:
1. A heat treatment apparatus comprising:
a first screw conveyor;
a second screw conveyor in parallel with the first screw conveyor;
a first nozzle pipe which is disposed on a lateral side of the first screw conveyor and which ejects a high-temperature gas composed of superheated steam or a high-temperature combustion gas; and
a second nozzle pipe which is disposed on a lateral side of the second screw conveyor and which ejects a high-temperature gas composed of superheated steam or a high-temperature combustion gas,
wherein, in the case where a discharge side of a kiln is viewed from an input side of the kiln for a raw material to be treated, the first nozzle pipe is disposed on a left lateral side of the first screw conveyor in the case where the first screw conveyor rotates right, and the first nozzle pipe is disposed on a right lateral side of the first screw conveyor in the case where the first screw conveyor rotates left, and
in the case where the discharge side of the kiln is viewed from the input side of the kiln for the raw material to be treated, the second nozzle pipe is disposed on the left lateral side of the second screw conveyor in the case where the second screw conveyor rotates right, and the second nozzle pipe is disposed on the right lateral side of the second screw conveyor in the case where the second screw conveyor rotates left, wherein, in the case where the discharge side of the kiln is viewed from the input side of the kiln for the raw material to be treated, the first screw conveyor rotates right, the second screw conveyor rotates left, the second screw conveyor is disposed on a right side of the first screw conveyor, the first nozzle pipe is disposed on the left lateral side of the first screw conveyor, and the second nozzle pipe is disposed on the right lateral side of the second screw conveyor, and wherein in the case where the discharge side of the kiln is viewed from the input side of the kiln for the raw material to be treated, the first nozzle pipe is disposed on an upper left side of the first screw conveyor, the second nozzle pipe is disposed on an upper right side of the second screw conveyor, the first nozzle pipe and the second nozzle pipe have a plurality of ejection sections, which are nozzles or holes for ejecting the high-temperature gas, and the plurality of ejection sections eject a high-temperature gas downward or laterally downward.

2. The heat treatment apparatus according to claim 1, wherein the high-temperature gas is superheated steam.

3. A system comprising:

a first heat treatment furnace that performs drying treatment, or drying treatment and torrefaction; and a second heat treatment furnace that performs torrefaction or carbonization treatment, wherein the first screw conveyor, the second screw conveyor, the first nozzle pipe, and the second nozzle pipe are disposed in each of the first heat treatment furnace and the second heat treatment furnace of the heat treatment apparatus of claim 1.

4. The heat treatment apparatus according to claim 3, wherein an inside of each of the first and second furnaces is filled with superheated steam to make the inside of the heat treatment furnace oxygen-free.

* * * * *